Jan. 21, 1941.  K. BRENKERT  2,229,237
SHUTTER FOR MOTION PICTURE MACHINES
Filed Nov. 21, 1938  2 Sheets-Sheet 1
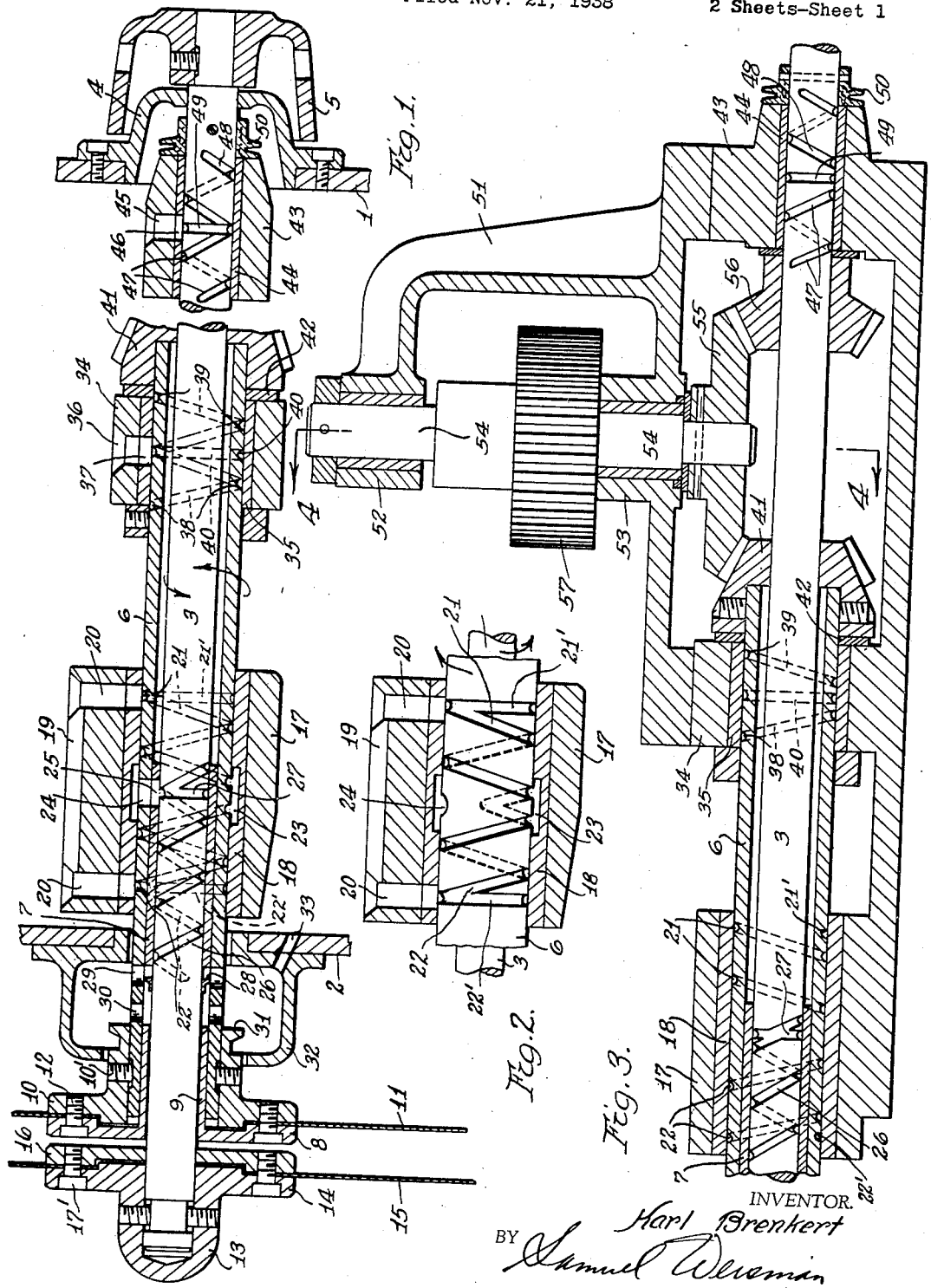
INVENTOR.
Karl Brenkert
BY Samuel Wiseman
ATTORNEY.

Jan. 21, 1941. K. BRENKERT 2,229,237
SHUTTER FOR MOTION PICTURE MACHINES
Filed Nov. 21, 1938 2 Sheets-Sheet 2

INVENTOR.
Karl Brenkert
BY Samuel Wiseman
ATTORNEY.

Patented Jan. 21, 1941

2,229,237

UNITED STATES PATENT OFFICE 2,229,237

SHUTTER FOR MOTION PICTURE MACHINES

Karl Brenkert, Detroit, Mich., assignor to Brenkert Light Projection Company, Detroit, Mich., a corporation of Michigan Application November 21, 1938, Serial No. 241,542

11 Claims. (Cl. 184—6)

The present invention pertains to a novel shutter for motion picture projectors or cameras. It is recognized that a double shutter, consisting of two blades or sets of blades rotating in opposite directions, is desirable for several reasons. A double shutter opens and closes faster than a single shutter and hence admits more light to the screen or to the unexposed film, as the case may be. In some projectors having a double shutter, one element thereof is placed behind the film and the other in front of the film. It is preferred, however, to have both elements behind the film where they cooperate in protecting the film against prolonged exposure to the heat of the projection lamp.

One of the problems involved in the last described arrangement and in double shutters in general is that of adequately lubricating the respective shafts of the shutter elements. In prior constructions it is necessary to lubricate the shafts by hand or from an independent lubricating means, and frequently with a special lubricant differing from that used for other parts of the machine. Also, much of the lubricant is thrown off the shafts by centrifugal force.

The principal object of the invention is to provide a double shutter arrangement lubricated automatically from the general lubricating system, with the same lubricant, by a positive feeding action and not subject to loss by centrifugal force. In other words the lubrication of the shutter shafts is incorporated in the general lubricating system and requires no special attention. Another object is to provide a well lubricated double shutter mechanism with both shutter blades disposed behind the film in a projector, with the desirable results mentioned above.

The invention is fully disclosed by way of example by the following description and the accompanying drawings, in which:

Figure 1 is a detail section of a projector housing, from front to rear, illustrating particularly the shutter assembly;

Figure 2 is a similar detail, showing the outer shaft in elevation;

Figure 3 is a plan section of the shutter shaft assembly and driving means therefor;

Reference to these views will now be made by use of like characters that are employed to designate corresponding parts throughout.

Figure 4:
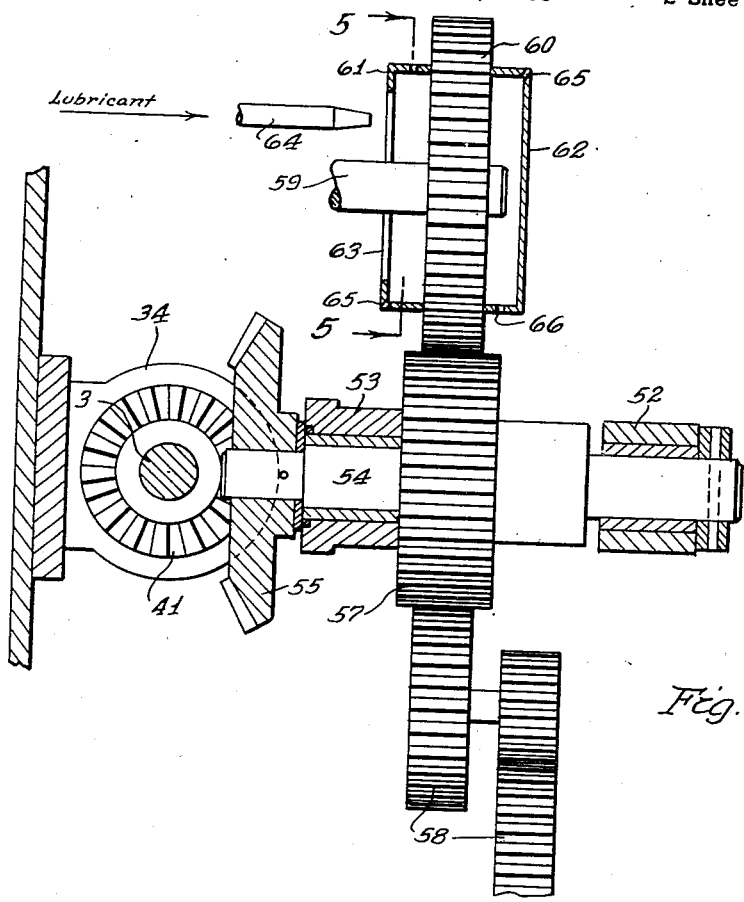
Figure 4 is a section on the line 4—4 of Figure 3.

In Figure 1 the numerals 1 and 2 designate respectively the front and rear walls of a projector housing. In and across these walls is journaled a shutter shaft 3. At the forward wall 1 the support consists of a bearing 4 inserted in the wall and through which the shaft extends. To the outer or exposed end of the shaft is secured a knob 5 for manual training.

The major portion of the shaft 3 is surrounded by an outer hollow shaft 6 extending through the rear wall 2, as may be seen in Figure 1. A bushing 7 surrounds an intermediate part of the shaft 3 to hold the shafts spaced apart. The part of the shaft 3 exterior of the wall 2 carries a collar 8 with a boss 9 extending along the shaft 3 within the shaft 6 to constitute a spacer in the same manner as the member 7. Adjacent to the member 8, another collar 10 is secured on the shaft 6. Shutter blades 11 are clamped between the collars 8 and 10 which are drawn together by studs 12.

In similar manner, the rear extremity of the shaft 3 extending beyond the shaft 6 has secured thereto a cap 13 formed with a collar 14. Shutter blades 15 are clamped to the collar 14 by a similar collar 16 and studs 17'. Thus, the shutters 11 are carried by the shaft 6 and the shutters 15 by the shaft 3. The shutters are so related to each other that, when driven in opposite directions, by the means presently to be described, they provide the proper exposure opening at predetermined intervals and of predetermined duration.

A main bearing 17 is provided for the intermediate portion of the shaft 6 and receives a liner or bushing 18 directly engaging the shaft. The top of the bearing is formed with a groove or trough 19 adapted to receive lubricant falling from a source presently to be described. Ports 20 lead from the trough 19 through the bearing and liner to the outer surface of the shaft 6.

Within the bushing 18, the outer surface of the shaft 6 is formed with two spiral grooves 21 and 22 opposite to each other in direction, extending from circular grooves 21' and 22' at the ports 20 and meeting substantially at the center of the bushing. As the shaft 6 is rotated, the grooves pick up the lubricant from the ports. The direction of the grooves is so related to the direction of rotation of the shaft that the lubricant is definitely forced along the grooves to their meeting ends, at the same time lubricating the shaft 6 at the inner surface of the bushing 18.

The bushing 18 is formed with an internal annular recess 23 approximately mid-way between its ends. The shaft 6 has ports 24 registering with this recess. Similarly, the bushing 7 has a port 25 adapted to register with the ports 24. The shaft 3 has a spiral groove 26 thereon from end to end of the bushing 7, terminating in a circular groove 27 at the ports 24.

In the operation of this portion of the device, lubricant is taken from the ports 20 by the circular grooves 21' and 22' and the spiral grooves 21 and 22 of the rotating shaft 6 and delivered to the recess 23, by a positive feeding action due to the direction of rotation of the shaft. From here it is communicated through ports 24 and 25 to the circular groove 27 and is similarly force-fed along the spiral groove 26 on the shaft 3 to lubricate this shaft in the bushing 7. The grooves 22 and 26 are in the same direction but feed lubricant in opposite directions, since they turn in opposite directions.

At the rear end of the bushing 7, a washer 28 is mounted on the shaft 3, spaced from the bushing to throw the circulating oil through ports 29 in the shaft 6, registering with the outlet end of groove 26.

Similar ports 30 throw any remaining oil against a flinger 31 on collar 10. The collar and the ported part of the shaft are enclosed in a housing 32 fixed to the wall 2 and drained at 33 into the housing, from which the oil may be recirculated by a pump. A slight clearance is required between the boss 9 and the shaft 3.

The forward portion of the shaft 6 has another bearing 34 in which is fitted a bushing 35. A passage 36 extends from the top of the bearing to a port 37 in the bushing. Within the bushing, the shaft 6 is formed externally with opposite spiral grooves 38 and 39, meeting at a central circular groove 40 communicating with the port 37. The forward extremity of the shaft 6 carries a bevel pinion 41 with a thrust washer 42 inserted between the pinion and the bearing. The grooves 38, 39 and 40 receive lubricant from passage 36 and feed it outwardly from groove 40 on rotation of the shaft in the direction indicated by the arrow.

The shaft 3 extends some distance forward of the shaft 6, as shown in Figure 1. This end is received in a bearing 43 fitted with a bushing 44. A passage 45 extends from the top of the bearing to a port 46 in the bushing 44. The shaft is formed with opposite spiral grooves 47 and 48 meeting at a circular groove 49 within the bushing, the latter groove communicating with the port 46. Lubricant is here collected and distributed outwardly, as by the grooves 38, 39 which respectively have the same direction as the grooves 47, 48. The felt washer 50 is secured to the shaft 3 and against the forward end of the bearing 43 to permit seepage of lubricant to the extreme forward bearing 4.

The structure incorporating the bearings 17, 34 and 43 is extended laterally at 51 to form two bearings 52 and 53 on a common axis perpendicular to that of the bearings previously named. In the bearings 52 and 53 is mounted a shaft 54 carrying a bevel gear 55 meshing at one side with the pinion 41 and at the other side with a similar pinion 56 fixed on the shaft 3. The shaft 54 is driven from a gear 57 thereon meshing preferably with the gear train 58 comprised in the projector mechanism, as for example, in my copending application, Serial No. 241,541, filed November 21, 1938.

Another shaft 59 over the shaft 54 is driven through a gear 60 meshing with the gear 57. The gear 60 on shaft 59, carries a lubricant distributor adapted to receive lubricant from a source and spray it over all the parts of the operating mechanism. The distributor may consist, for example, of cups 61 and 62 mounted at opposite faces at the gear 60 and fed from a pump that drains the bottom of the housing. The cup 61 is open at 63 to lubricant admitted from a pipe 64. In such case the interior of the gear 60 is spoked or apertured or is merely a ring gear around the cups, as shown in my copending application, to permit passage of the lubricant to the cup 62. Both the cups are ported at 65 and 66 for discharge and dispersion of the lubricant by centrifugal force.

The discharged lubricant is distributed over all working parts of the mechanism. Moreover, the same dispersion is collected at the shutter shaft bearings 17, 34, and 43 and distributed to the shafts in the manner described. It may now be seen that the shutter shafts need not be lubricated separately from the remainder of the mechanism and do not require a special lubricant, since they are lubricated automatically from one common source. The surplus lubricant drains into the bottom of the housing from which it may be circulated back to the line 64 as disclosed in my copending application.

Because of the proximity of the shutter blades 11 and 15 to each other, the shafts 3 and 6 cannot be independently supported but require the inner bearing or bushing 7. This member is preferably fitted tightly in shaft 6. The relative speed between the members 3 and 7, turning in opposite directions, is about 2880 R. P. M. in practice. The problem of lubricating the bearing surfaces at this high speed, which is solved by this invention, has heretofore been so serious as to retard the general adoption of a double shutter driven by concentric shafts.

Figures 5, 6:
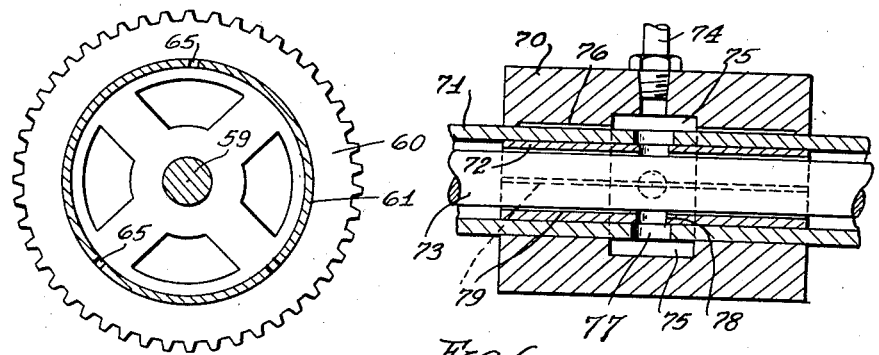
Figure 5 is a section on the line 5—5 of Figure 4.
Figure 6 is a cross sectional view of a modification.

Figure 6 illustrates a modified construction wherein the pressure on the lubricant is supplied from some outside source rather than by the formation of the shafts. As in the previous construction, the main bearing 70 receives a hollow shaft 71. The latter receives a bushing 72 fitted tightly therein and rotating therewith, and the bushing in turn receives the inner shutter shaft 73 geared to rotate oppositely to the shaft 71.

A line 74 delivers lubricant from any suitable source under pressure to an annular channel 75 in the inner wall of the bearing 70. Two grooves 76 extend in opposite directions and in alignment from the channel 75 to lubricate the shaft 71 in the bearing 70. The shaft 70 has a number of ports 77, preferably four, registering with the channel 75. The bushing 72 has a similar number of ports 78 adapted to register with the ports 77 as the shafts rotate. The inner surface of the bushing 72 is formed with lengthwise grooves 79 crossing the ports 78 and opening at both ends into the space between the shafts for drainage into the housing. Free circulation of lubricant from the pressure source is thus permitted.

Although specific embodiments of the invention have been illustrated and described, it will be understood that various alterations in the details of construction may be made without departing from the scope of the invention, as indicated by the appended claims.

What I claim is:

1. In combination, a hollow rotary member, an outer bearing therefor, an inner rotary member journaled in the hollow member, said hollow member having a fluid conveying passage in its outer surface along said bearing, said passage having an inlet and an outlet, means for delivering fluid to said inlet, said inner member having a fluid conveying passage in its outer surface where journaled in said hollow member, the latter passage having an inlet and an outlet, the inlet of the latter passage being directly connected to the outlet of the first passage to provide a continuous fluid path from the outlet of the first passage to the inlet of the second passage, and means for imparting relative rotation to said members.

2. In combination, a hollow rotary member, an outer bearing therefor, an inner rotary member journaled in the hollow member, said hollow member having a fluid conveying spiral groove in its outer surface along said bearing, said spiral groove having an inlet and an outlet, means for delivering fluid to said inlet, said inner member having a fluid conveying spiral groove in its outer surface where journaled in said hollow member, the latter spiral groove having an inlet and an outlet, the inlet of the latter spiral groove being directly connected to the outlet of the first named spiral groove to provide a continuous fluid path from the outlet of the first passage to the inlet of the second passage, and means for imparting relative rotation to said members.

3. In combination, a hollow rotary member, an outer bearing therefor, an inner rotary member journaled in the hollow member, said hollow member having a fluid conveying spiral groove in its outer surface along said bearing, said spiral groove having an inlet and an outlet, means for delivering fluid to said inlet, said inner member having a fluid conveying spiral groove in its outer surface where journaled in said hollow member, the latter spiral groove having an inlet and an outlet, the inlet of the latter spiral groove being directly connected to the outlet of the first named spiral groove to provide a continuous fluid path from the outlet of the first passage to the inlet of the second passage, said spiral groove having an inlet and an outlet, said grooves winding in the same direction on their respective members, and means for imparting opposite rotation to said members.

4. In combination, a pair of rotatable shafts mounted one within the other, a bearing for the outer shaft, another bearing between said shafts, said outer bearing having a passage adapted to admit lubricant thereinto, means on said outer shaft for delivering lubricant from said passage along said outer bearing, said means having an inlet and an outlet, and means for delivering lubricant from the outlet of the first means to the bearing surface of the inner bearing, the second means having an inlet spaced from said passage axially of said shafts.

5. In combination, a pair of rotatable shafts mounted one within the other, a bearing for the outer shaft, another bearing between said shafts, said outer bearing having a passage adapted to admit lubricant thereinto, means on said outer shaft for delivering lubricant from said passage along said outer bearing, said means having an inlet and an outlet, and means on said inner shaft for delivering lubricant from the outlet of the first means into said inner bearing, the second means having an inlet spaced from said passage axially of said shafts.

6. In combination, a pair of rotatable shutter shafts mounted one within the other, a bearing for the outer shaft, another bearing between said shafts, said outer bearing having a passage adapted to admit lubricant thereinto, means on said outer shaft for delivering lubricant from said passage along said outer bearing, said means having an inlet and an outlet, means for delivering lubricant from the outlet of the first means to the bearing surface of the inner bearing, the second means having an inlet spaced from said passage axially of said shafts, and means for rotating said shafts in opposite directions.

7. In combination, a pair of rotatable shafts mounted one within the other, a bearing for the outer shaft, another bearing between said shafts, said outer bearing having a passage adapted to admit lubricant thereinto, and having an internal channel spaced from said passage, said outer shaft having a spiral groove extending from said passage to said channel, and means for delivering lubricant from said channel to the bearing surface of the inner bearing.

8. In combination, a pair of rotatable shafts mounted one within the other, a bearing for the outer shaft, another bearing between said shafts, said outer bearing having a passage adapted to admit lubricant thereinto, and having an internal channel spaced from said passage, said outer shaft having a spiral groove extending from said passage to said channel, the inner shaft having a spiral groove extending from said channel along the inner bearing and communicating with said channel.

9. In combination, a pair of rotatable shafts mounted one within the other, a bearing for the outer shaft, another bearing between said shafts, said outer bearing having passages at its ends adapted to admit lubricant thereinto, and having an intermediate internal annular channel, said outer shaft having opposed spiral grooves each extending from one of said passages to said channel, the inner shaft having a spiral groove extending from said channel along the inner bearing and communicating with said channel, the last named groove having the same direction as the surrounding groove on said outer shaft, whereby said last named grooves deliver lubricant respectively in opposite directions on rotation of said shafts in opposite directions.

10. In combination, a pair of rotatable shafts mounted one within the other, a bearing for the outer shaft, another bearing between said shafts, and rotatable with said outer shaft, said outer bearing having passages at its ends adapted to admit lubricant thereinto, and having an intermediate internal annular channel, said outer shaft having opposed spiral grooves each extending from one of said passages to said channel, the inner shaft having a spiral groove extending from said channel along the inner bearing and communicating with said channel, the last named groove having the same direction as the surrounding groove on said outer shaft, whereby said last named grooves deliver lubricant respectively in opposite directions on rotation of said shafts in opposite directions.

11. In combination, a pair of rotatable shafts mounted one within the other, a bearing for the outer shaft, another bearing between said shafts, said outer bearing having a passage adapted to admit lubricant thereinto, said outer shaft having a spiral groove extending from said passage along the outer bearing and adapted to draw lubricant from said passage on rotation of the outer shaft, said inner shaft having a spiral groove extending from a point spaced from said passage axially of said shafts, said groove extending along said other bearing, means at said point establishing communication between the grooves, the second groove being adapted to draw lubricant from said means on rotation of the inner shaft, whereby to provide forced flow of lubricant from said passage through the first groove, said means, and the second groove.

KARL BRENKERT.